United States Patent
Wu et al.

(10) Patent No.: US 8,449,178 B2
(45) Date of Patent: May 28, 2013

(54) OPTICAL FIBER TEMPERATURE SENSOR

(75) Inventors: Shudong Wu, Beijing (CN); Wenbo Wang, Beijing (CN)

(73) Assignee: Beijing Qi-Red Electric Power Technology Co., Ltd., Beijing (CN)

( * ) Notice: Subject to any disclaimer, the term of this patent is extended or adjusted under 35 U.S.C. 154(b) by 338 days.

(21) Appl. No.: 12/877,083

(22) Filed: Sep. 7, 2010

(65) Prior Publication Data

US 2011/0128990 A1  Jun. 2, 2011

(30) Foreign Application Priority Data

Dec. 1, 2009  (CN) .......................... 2009 1 0238685

(51) Int. Cl.
*G01K 11/00* (2006.01)
*G01K 1/00* (2006.01)
*G01J 5/00* (2006.01)

(52) U.S. Cl.
USPC ............................ 374/161; 374/131; 374/120

(58) Field of Classification Search
USPC ......................................... 374/161, 131, 120
See application file for complete search history.

(56) References Cited

U.S. PATENT DOCUMENTS

| | | | | |
|---|---|---|---|---|
| 5,096,277 | A * | 3/1992 | Kleinerman | 385/12 |
| 5,513,913 | A * | 5/1996 | Ball et al. | 374/120 |
| 5,928,222 | A * | 7/1999 | Kleinerman | 606/16 |
| 2006/0239330 | A1* | 10/2006 | Yamate et al. | 374/161 |
| 2007/0006663 | A1* | 1/2007 | Zerwekh et al. | 73/800 |
| 2010/0111136 | A1* | 5/2010 | Huang et al. | 374/161 |
| 2010/0141930 | A1* | 6/2010 | Omichi et al. | 356/33 |

* cited by examiner

*Primary Examiner* — Mirellys Jagan

(57) ABSTRACT

An optical fiber temperature sensor includes an optical transceiver module, a transmission fiber and a sensing head. When the transmission fiber is a polarization maintaining fiber, the sensing head includes a temperature sensing element and a fiber reflector, the temperature sensing element is a section of polarization maintaining fiber. The transmission fiber is fusion spliced with the temperature sensing element, an angle between a polarization axis of the transmission fiber and that of the temperature sensing element is 45 degree at the fusion splicing point. When the transmission fiber is a single-mode fiber, the sensing head includes a polarizer. An angle between a polarization axis of the polarization maintaining fiber connecting the temperature sensing element with the polarizer and that of the polarization maintaining fiber of the temperature sensing element is 45 degree at the fusion splicing point. The present invention is of simple principle and structure, and facilitates manufacturing.

12 Claims, 2 Drawing Sheets

OPTICAL FIBER TEMPERATURE SENSOR

BACKGROUND OF THE PRESENT INVENTION

1. Field of Invention

The present invention relates to an optical fiber sensing technology, and more particularly to a new optical fiber temperature sensor.

2. Description of Related Arts

Optical fiber temperature sensors have a wide range of applications. They use optical fiber as the optical path for separating the probe from the instrument so as to improve the environmental adaptability. The sensor can work under conditions of strong electromagnetic interference, high voltage and electrical power transmission without using any additional wire. Currently, fluorescent sensors, birefringent crystal sensors and semiconductor sensors are the major successful optical fiber temperature sensors. Most of the existing optical fiber temperature sensors are mostly based on the principle of the spectral analysis, such as the fiber grating mentioned in the reference [1] of Fiber Bragg Grating Temperature Sensor with Controllable Sensitivity; Jaehoon Jung, Hui Nam, Byoungho Lee, Jae Oh Byun, and Nam Seong Kim; Applied Optics, Vol. 38, no 13, pp. 2752-2754; the fiber Fabry-Perot etalon mentioned in the reference [2] of Fabry-Perot Fiber-Optic Temperature Sensor; Lewis Research Center, Cleveland, Ohio NASA, Tech Briefs; Friday, Jan. 1, 1999; semiconductor absorption sensor mentioned in the reference [3] of Optical Fiber Temperature Sensor Applying Spectral Analysis; Sensor Technology, Vol. 20, Issue 11; 2001. They all require spectral analysis, and have complex manufacturing process and high cost.

SUMMARY OF THE PRESENT INVENTION

An object of the present invention is to provide a new optical fiber temperature sensor, which has simple structure, high measurement accuracy, easy manufacture and low cost, and is adapted for the temperature measurement under high voltage condition.

Accordingly, in order to accomplish the above object, the present invention provides an optical fiber temperature sensor, comprising:

a transmission fiber comprising a first polarization maintaining fiber;

a sensing head comprising:

a temperature sensing element comprising a second polarization maintaining fiber, wherein one end of the temperature sensing element is connected with the transmission fiber; and a fiber reflector provided at the other end of the temperature sensing element; and an optical transceiver module for transmitting light to the sensing head by the transmission fiber, wherein the first polarization maintaining fiber of the transmission fiber is fusion spliced with the second polarization maintaining fiber of the temperature sensing element, an angle between a polarization axis of the first polarization maintaining fiber of the transmission fiber and a polarization axis of the second polarization maintaining fiber of the temperature sensing element is 45 degree at a fusion splicing point.

Also, the present invention provides an optical fiber temperature sensor, comprising:

a transmission fiber comprising a single-mode fiber;

a sensing head comprising:

a polarizer;

a temperature sensing element comprising a first polarization maintaining fiber, wherein one end of the temperature sensing element is connected with the polarizer by a second polarization maintaining fiber; and a fiber reflector provided at the other end of the temperature sensing element; and an optical transceiver module for transmitting light to the sensing head by the transmission fiber, wherein the second polarization maintaining fiber connecting the temperature sensing element with the polarizer is fusion spliced with the first polarization maintaining fiber of the temperature sensing element, an angle between a polarization axis of the second polarization maintaining fiber connecting the temperature sensing element with the polarizer and a polarization axis of the first polarization maintaining fiber of the temperature sensing element is 45 degree at a fusion splicing point.

The present invention shows advantages as follow.

1. The optical fiber temperature sensor of the present invention has the simple principle and structure, and facilitates manufacturing.

2. In the present invention, the sensitivity of the optical fiber temperature sensor is adjustable. Changing the length of the polarization maintaining fiber of the temperature sensing element can meet the application requirements of different temperature ranges.

3. The relative accuracy of the temperature measurement can be as high as 0.5%.

These and other objects, features, and advantages of the present invention will become apparent from the following detailed description, the accompanying drawings, and the appended claims.

DETAILED DESCRIPTION OF THE PREFERRED EMBODIMENT

The present invention is further explained with accompanying drawings. The present invention provides two embodiments to describe the optical fiber temperature sensors using the polarization maintaining fiber as the temperature sensing element.

EXAMPLE 1

Figure 1:
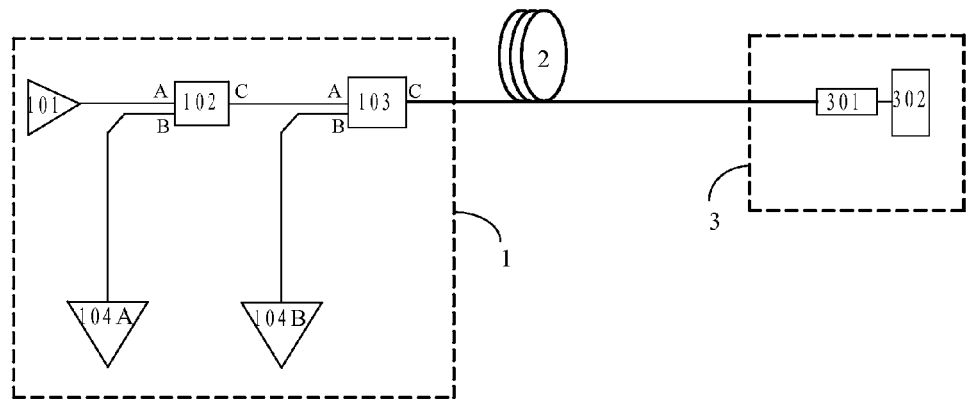
FIG. 1 is a schematic diagram of an optical fiber temperature sensor according to a first preferred embodiment of the present invention.

Referring to FIG. 1, an optical fiber temperature sensor according to the first preferred embodiment of the present invention is illustrated, wherein the optical fiber temperature sensor comprises an optical transceiver module 1, a transmission fiber 2 and a sensing head 3 at a distance for sensing the temperature of the measured point. The optical transceiver module 1 is used to transmit the light to the sensing head 3 by the transmission fiber 2. The sensing head 3 returns the light intensity information containing the temperature information to the optical transceiver module 1 by the transmission fiber 2, thus obtaining the temperature information of the measured point. The transmission fiber 2 is polarization maintaining fiber. The sensing head 3 comprises a temperature sensing element 301 and a fiber reflector 302, wherein the temperature sensing element 301 is a section of polarization maintaining fiber, one end of the temperature sensing element 301 is connected with the transmission fiber 2, the fiber reflector 302 is at the other end of the temperature sensing element 301. The optical transceiver module 1 comprises a light source 101, an optical circulator 102, a polarization beam splitter 103, a first photoelectric detector 104A, and a second photoelectric detector 104B. The optical circulator 102 and the polarization beam splitter 103 are a three-port device. The first port A and the second port B of the optical circulator 102 are connected with the light source 101 and the first photoelectric detector 104A by single-mode fibers, respectively. The third port C of the optical circulator 102 is connected with the first port A of the polarization beam splitter 103 by a single-mode fiber. The second port B of the polarization beam splitter 103 is connected with the second photoelectric detector 104B by a single-mode fiber. The third port C of the polarization beam splitter 103 is connected with the transmission fiber 2, namely, the polarization maintaining fiber.

The length of the polarization maintaining fiber used by the temperature sensing element 301 is determined by the measured temperature range. In general, the larger the measured temperature range, the shorter the polarization maintaining fiber which is used as the temperature sensing element 301; and vice versa.

The polarization maintaining fiber used by the transmission fiber 2 is fusion spliced with the polarization maintaining fiber used by the temperature sensing element 301. The angle between a polarization axis of the polarization maintaining fiber used by the transmission fiber 2 and a polarization axis of the polarization maintaining fiber used by the temperature sensing element 301 is 45 degree at the fusion splicing point.

FIG. 1 shows the light directions in the optical fiber temperature sensor of the present invention. The light emitted by the light source 101 passes through the optical circulator 102 to the polarization beam splitter 103. The output light of the polarization beam splitter 103 is a linearly polarized light, and is transmitted along one polarization axis of the transmission fiber 2. While entering the temperature sensing element 301, the linearly polarized light is decomposed into a pair of linearly polarized light components at +/−45 degree, respectively. The pair of linearly polarized light components are transmitted along two polarization axes of the temperature sensing element 301, respectively. After reflected back by the fiber reflector 302, the two linearly polarized light components retrace their original optical path. While entering the transmission fiber 2 again, the two linearly polarized light components in the temperature sensing element 301 are projected at +/−45 degree at the two polarization axes of the transmission fiber 2, respectively. The light on each polarization axis of the transmission fiber 2 consists two compositions from the two polarization axes of the transmission fiber 2. Their phase differences of the two compositions are $2\delta$ and $2\delta+180°$, respectively, wherein $\delta$ is a single-pass birefringence phase difference of the temperature sensing element. Therefore, the light intensity on every polarization axis of the transmission fiber 2 is the interference result of a pair of linearly polarized light components of the temperature sensing element 301. A pair of linearly polarized light in the transmission fiber 2 are led to the first photoelectric detector 104A and the second photoelectric detector 104B by the polarization beam splitter 103 and the optical circulator 102, respectively. The first photoelectric detector 104A and the second photoelectric detector 104B detect the light intensity information of a pair of linearly polarized light in the transmission fiber 2, respectively. The birefringence phase difference of the temperature sensing element 301 is a function of temperature and the temperature can be determined by the following formula $$F(T) = \frac{D_1 - D_2}{D_1 + D_2},$$

wherein $D_1$ and $D_2$ are two readings of the first photoelectric detector 104A and the second photoelectric detector 104B, respectively.

Figure 2:
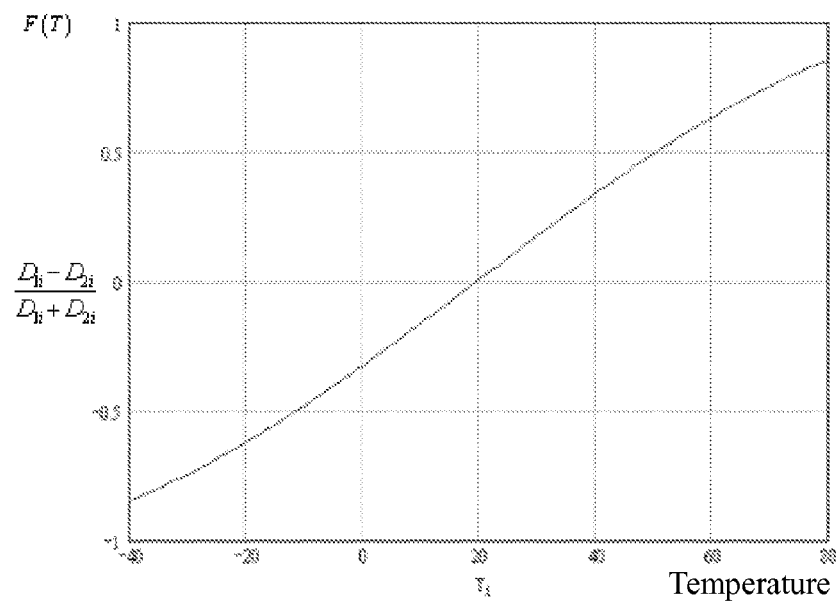
FIG. 2 is a typical temperature response curve of the optical fiber temperature sensor.

FIG. 2 is a typical curve of function F (T). Obtaining the function value F by the readings $D_1$ and $D_2$, and then obtaining the temperature value T from the pre-calibration function curve F (T).

EXAMPLE 2

Based on the same principle of the example 1, another simplified embodiment can be used.

Figure 3:
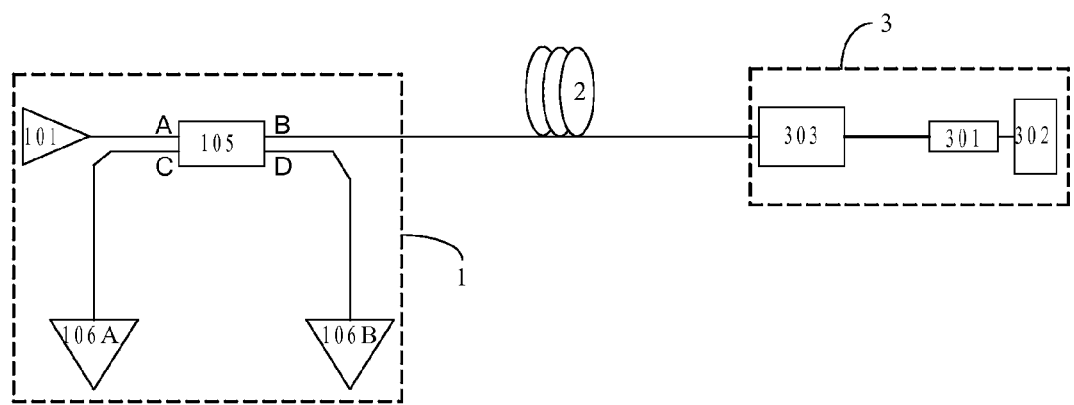
FIG. 3 is the schematic diagram of a simplified optical fiber temperature sensor according to a second preferred embodiment of the present invention.

In the first embodiment, the readings $D_1$ and $D_2$ of the first photoelectric detector 104A and the second photoelectric detector 104B contain the temperature information, so the present invention can be simplified to be a single-path. Therefore, instead of the two-path polarization maintaining fiber, single-mode fiber can also be used as the transmission fiber 2. In the same time, a two-port polarizer 303 is used instead of the three-port polarization beam splitter 103. To minimize the effect of light intensity variation, a pair of photoelectric detectors are still used, and a four-port fiber coupler 105 is used instead of the optical circulator 102. Referring to FIG. 3, an optical fiber temperature sensor according to the second preferred embodiment of the present invention is illustrated, wherein the optical fiber temperature sensor comprises an optical transceiver module 1, a transmission fiber 2 and a sensing head 3. The transmission fiber 2 is a single-mode fiber, and two ends of the transmission fiber 2 are connected with the fiber coupler 105 and the polarizer 303 of the sensing head 3, respectively. The sensing head 3 comprises a temperature sensing element 301, a fiber reflector 302 and a polarizer 303. The temperature sensing element 301 is a section of polarization maintaining fiber. One end of the temperature sensing element 301 is connected with the polarizer 303 by a polarization maintaining fiber. The fiber reflector 302 is at the other end of the temperature sensing element 301. Also, the temperature sensing element 301 is fusion spliced with the polarization maintaining fiber which connects the temperature sensing element 301 with the polarizer 303. An angle between a polarization axis of the polarization maintaining fiber used by the temperature sensing element 301 and a polarization axis of the polarization maintaining fiber which connects the temperature sensing element 301 to the polarizer 303 is 45 degree at the fusion splicing point.

The optical transceiver module 1 comprises a light source 101, a fiber coupler 105, a first photoelectric detector 106A, and a second photoelectric detector 106B. The fiber coupler 105 is connected with the light source 101 by a single-mode fiber. The fiber coupler 105 is connected with the polarizer 303 by a single-mode fiber. The fiber coupler 105 is a four-port device, wherein a first port A is used to receive the light emitted by the light source, a second port B is connected with the transmission fiber 2, a third port C and a fourth port D are connected with the first photoelectric detector 106A and the second photoelectric detector 106B, respectively. The first photoelectric detector 106A is used to detect the returned polarization intensity $D_3$ by a single-mode fiber. The second photoelectric detector 106B is used to detect the light intensity $D_4$ of the light emitted by the light source 101 for monitoring the optical power. From the measured $D_3$ and $D_4$, function F (T) is obtained by the following formula:

$$F(T) = \frac{D_3}{D_4}$$

wherein $D_3$ and $D_4$ are the readings of the first photoelectric detector 106A and the second photoelectric detector 106B, respectively, then the temperature value T can be determined by the pre-calibration function curve F (T).

In the second preferred embodiment, the transmission polarization maintaining fiber, the polarization beam splitter and the optical circulator in the first preferred embodiment are replaced by the single-mode fiber, the polarizer and the optical fiber coupler, respectively, so that the cost of the optical fiber temperature sensor is greatly reduced. The second preferred embodiment is adapted for the low precision applications.

One skilled in the art will understand that the embodiment of the present invention as shown in the drawings and the description above is exemplary only but not intended to be limiting.

It will thus be seen that the object of the present invention has been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An optical fiber temperature sensor, comprising:
a transmission fiber comprising a first polarization maintaining fiber;
a sensing head comprising:
a temperature sensing element comprising a second polarization maintaining fiber, wherein one end of said temperature sensing element is connected with said transmission fiber; and
a fiber reflector provided at the other end of said temperature sensing element; and
an optical transceiver module for transmitting light to said sensing head by said transmission fiber,
wherein said first polarization maintaining fiber of said transmission fiber is fusion spliced with said second polarization maintaining fiber of said temperature sensing element, and an angle between a polarization axis of said first polarization maintaining fiber of said transmission fiber and a polarization axis of said second polarization maintaining fiber of said temperature sensing element is 45 degree at a fusion splicing point,
wherein said optical transceiver module comprises a light source, an optical circulator, a polarization beam splitter, a first photoelectric detector, and a second photoelectric detector, wherein said optical circulator and said polarization beam splitter are three-port devices, wherein a first port and a second port of said optical circulator are connected with said light source and said first photoelectric detector by a single-mode fiber, respectively, a third port of said optical circulator is connected with a first port of said polarization beam splitter by a single-mode fiber, a second port of said polarization beam splitter is connected with said second photoelectric detector by a single-mode fiber, a third port of said polarization beam splitter is connected with said transmission fiber.

2. The optical fiber temperature sensor, as recited in claim 1, $$F(T) = \frac{D_1 - D_2}{D_1 + D_2},$$

wherein a temperature T to be measured is determined by a formula of wherein D1 and D2 are two readings of said first photoelectric detector and said second photoelectric detector, respectively.

3. The optical fiber temperature sensor, as recited in claim 1, wherein a length of said second polarization maintaining fiber of said temperature sensing element is determined by a measured temperature range.

4. The optical fiber temperature sensor, as recited in claim 3, wherein a temperature T to be measured is determined by a formula of $$F(T) = \frac{D_1 - D_2}{D_1 + D_2},$$

wherein D1 and D2 are two readings of said first photoelectric detector and said second photoelectric detector, respectively.

5. An optical fiber temperature sensor, comprising:
a transmission fiber comprising a first polarization maintaining fiber;
a sensing head comprising:
a temperature sensing element comprising a second polarization maintaining fiber, wherein one end of said temperature sensing element is connected with said transmission fiber; and
a fiber reflector provided at the other end of said temperature sensing element; and
an optical transceiver module for transmitting light to said sensing head by said transmission fiber,
wherein said first polarization maintaining fiber of said transmission fiber is fusion spliced with said second polarization maintaining fiber of said temperature sensing element, and an angle between a polarization axis of said first polarization maintaining fiber of said transmission fiber and a polarization axis of said second polarization maintaining fiber of said temperature sensing element is 45 degree at a fusion splicing point,
wherein a temperature T to be measured is determined by a formula of $$F(T) = \frac{D_1 - D_2}{D_1 + D_2},$$

wherein D1 and D2 are two readings of said first photoelectric detector and said second photoelectric detector, respectively.

6. The optical fiber temperature sensor, as recited in claim 5, wherein a length of said second polarization maintaining fiber of said temperature sensing element is determined by a measured temperature range.

7. An optical fiber temperature sensor, comprising:
a transmission fiber comprising a single-mode fiber;

a sensing head comprising:

a polarizer;

a temperature sensing element comprising a first polarization maintaining fiber, wherein one end of said temperature sensing element is connected with said polarizer by a second polarization maintaining fiber; and a fiber reflector provided at the other end of said temperature sensing element; and an optical transceiver module for transmitting light to said sensing head by said transmission fiber, wherein said second polarization maintaining fiber connecting said temperature sensing element with said polarizer is fusion spliced with said first polarization maintaining fiber of said temperature sensing element, an angle between a polarization axis of said second polarization maintaining fiber connecting said temperature sensing element with said polarizer and a polarization axis of said first polarization maintaining fiber of said temperature sensing element is 45 degree at a fusion splicing point, wherein said optical transceiver module comprises a light source, a fiber coupler, a first photoelectric detector, and a second photoelectric detector, said fiber coupler is a four-port device, wherein a first port of said fiber coupler is connected with said light source by a single-mode fiber, a second port of said fiber coupler is connected with said transmission fiber by a single-mode fiber, a third port and a fourth port of said fiber coupler are connected with said first photoelectric detector and said second photoelectric detector, respectively.

8. The optical fiber temperature sensor, as recited in claim 7, $$F(T) = \frac{D_3}{D_4},$$

wherein a temperature T to be measured is determined by a formula of wherein D3 and D4 are two readings of said first photoelectric detector and said second photoelectric detector, respectively.

9. The optical fiber temperature sensor, as recited in claim 7, wherein a length of said first polarization maintaining fiber of said temperature sensing element is determined by a measured temperature range.

10. The optical fiber temperature sensor, as recited in claim 9, $$F(T) = \frac{D_3}{D_4},$$

wherein a temperature T to be measured is determined by a formula of wherein D3 and D4 are two readings of said first photoelectric detector and said second photoelectric detector, respectively.

11. An optical fiber temperature sensor, comprising:

a transmission fiber comprising a single-mode fiber;

a sensing head comprising:

a polarizer;

a temperature sensing element comprising a first polarization maintaining fiber, wherein one end of said temperature sensing element is connected with said polarizer by a second polarization maintaining fiber; and a fiber reflector provided at the other end of said temperature sensing element; and an optical transceiver module for transmitting light to said sensing head by said transmission fiber, wherein said second polarization maintaining fiber connecting said temperature sensing element with said polarizer is fusion spliced with said first polarization maintaining fiber of said temperature sensing element, an angle between a polarization axis of said second polarization maintaining fiber connecting said temperature sensing element with said polarizer and a polarization axis of said first polarization maintaining fiber of said temperature sensing element is 45 degree at a fusion splicing point, wherein a temperature T to be measured is determined by a formula of $$F(T) = \frac{D_3}{D_4},$$

wherein D3 and D4 are two readings of said first photoelectric detector and said second photoelectric detector, respectively.

12. The optical fiber temperature sensor, as recited in claim 1, wherein a length of said first polarization maintaining fiber of said temperature sensing element is determined by a measured temperature range.

* * * * *